United States Patent [19]

Sugimoto et al.

[11] Patent Number: 4,713,435
[45] Date of Patent: Dec. 15, 1987

[54] PROCESS FOR PRODUCING AROMATIC POLYESTER

[75] Inventors: Hiroaki Sugimoto, Takatsuki; Kazuo Hayatsu; Masahiro Fujiwara, both of Ibaraki, all of Japan

[73] Assignee: Sumitomo Chemical Company, Limited, Osaka, Japan

[21] Appl. No.: 923,261

[22] Filed: Oct. 27, 1986

[30] Foreign Application Priority Data

Oct. 31, 1985 [JP]  Japan .................................. 60-245725

[51] Int. Cl.[4] ............................................. C08G 73/10
[52] U.S. Cl. .................................... 528/179; 528/176; 528/190; 528/191; 528/193; 528/194
[58] Field of Search ................ 528/176, 179, 190, 191, 528/193, 194, 499

[56] References Cited

U.S. PATENT DOCUMENTS

| | | | |
|---|---|---|---|
| 4,202,965 | 5/1980 | Shimizu et al. | 528/499 |
| 4,219,635 | 8/1980 | Cooke et al. | 528/182 |
| 4,294,956 | 10/1981 | Berger et al. | 528/179 |
| 4,314,051 | 2/1982 | Berger et al. | 528/179 |
| 4,401,803 | 8/1983 | Rieder | 528/176 |
| 4,533,720 | 8/1985 | Yu | 528/125 |

*Primary Examiner*—Lucille M. Phynes
*Attorney, Agent, or Firm*—Stevens, Davis, Miller & Mosher

[57] ABSTRACT

A process for producing an aromatic polyester by polycondensation of either (1)

(a) aromatic hydroxycarboxylic acids containing at least 50 mole % of p-hydroxybenzoic acid, and/or ester-forming derivatives of these acids, (b) an aromatic dicarboxylic acid and/or an ester-forming derivative of aromatic dicarboxylic acid, and (c) an aromatic dihydroxy compound and/or an ester-forming derivative of aromatic dihydroxy compound, wherein the (a):(b) molar ratio and the (a):(c) molar ratio are each from 1:0 to 1:4, or (2)

(d) aromatic dicarboxylic acids containing at least 50 mole % of terephthalic acid, and/or ester-forming derivatives of these acids and (e) aromatic dihydroxy compounds containing at least 50 mole % of at least one of hydroquinone, substituted hydroquinone, 4,4'-dihydroxydiphenyl, and substituted 4,4'-dihydroxydiphenyl, and/or ester-forming derivatives of these dihydroxy compounds, characterized in that the polycondensation is carried out by using a liquid compound which has a higher boiling point at normal pressure than the temperature of this reaction and is inert to the reaction, in an amount satisfying the equation (theoretical quantity of aromatic polyester formed)/{(theoretical quantity of aromatic polyester formed) + (quantity of liquid compound)} = 0.70 to 0.98, by weight.

11 Claims, No Drawings

PROCESS FOR PRODUCING AROMATIC POLYESTER

BACKGROUND OF THE INVENTION

1. FIELD OF THE INVENTION

The present invention relates to a process for producing a crystalline aromatic polyester.

2. DESCRIPTION OF THE PRIOR ART

In recent years crystalline aromatic polyesters are used for various industrial materials since these polyesters are superior in heat resistance and solvent resistance. The slurry polycondensation and the bulk polycondensation processes are known as the processes for producing aromatic polyesters.

However, such a slurry polycondensation process has problems in that the crystalline aromatic polyester produced thereby exhibits variations in physical properties because its particle size distribution is not enough uniform, and that the product polyester tends to develop color because of its insufficient heat stability. Another problem of this process is that high reaction temperatures, as compared with low reaction temperatures, raises the molecular weight of product but causes the used solvent to remain in the product, which therefore needs to be washed to remove the remaining solvent. Whereas, a bulk polymerization process without using any solvents is reasonable because it can simplify or omit a post-treatment process, for example, a washing or produced polymer. However, the bulk polycondensation process has many problems which are an un-uniformity of polymer melt with high viscosity and an adhesiveness of polymer to walls of reaction vessel.

SUMMARY OF THE INVENTION

An object of the present invention is to provide a process for producing a crystalline aromatic polyester which has a sufficiently uniform distribution of particle size and exhibits less variations in physical properties and excellent heat stability, being not liable to develop color. According to the process of the present invention, the problems which are an un-uniformity of polymer melt with high viscosity and an adhesiveness of polymer to walls of reaction vessel are solved, and it will be unnecessary to remove the remaining solvent from the produced polymer by washing.

The present inventors have concentrated efforts continuously on the study of processes for producing aromatic polyesters. As a result, it has been found that the above and other objects of the present invention can be achieved by a polycondensation using a specific amount of a liquid compound inert to this reaction and having a specific boiling point. Based on this finding, the present invention has been accomplished. According to the present invention, there is provided a process for producing an aromatic polyester by polycondensation of the following ingredients (a), (b), and (c) or ingredients (d) and (e), characterized in that the polycondensation is carried out by using a liquid compound which has a higher boiling point under normal pressure than the temperature of the reaction and is inert to the reaction, in an amount satisfying the equation (hereinafter referred to as equation I)

(theoretical quantity of aromatic polyester formed)/{(theoretical quantity of aromatic polyester formed) + (quantity of liquid compound)} = 0.70 to 0.98, by weight;

(a) an aromatic hydroxycarboxylic acids containing at least 50 mole % of p-hydroxybenzoic acid, and/or ester-forming derivatives of these acids, (b) an aromatic dicarboxylic acid and/or an ester-forming derivative of aromatic dicarboxylic acid, and (c) an aromatic dihydroxy compound and/or an ester-forming derivative of aromatic dihydroxy compound, wherein the (a):(b) molar ratio and the (a):(c) molar ratio are each from 1:0 to 1:4;

(d) aromatic dicarboxylic acids containing at least 50 mole % of terephthalic acid, and/or ester-forming derivatives of these acids, and (e) aromatic dihydroxy compounds containing at least 50 mole % of at least one of hydroquinone, substituted hydroquinone, 4,4'-dihydroxydiphenyl, and substituted 4,4'-dihydroxydiphenyl, and/or ester-forming derivatives of these dihydroxy compounds.

DETAILED DESCRIPTION OF THE INVENTION

Examples of the ingredient (a) are aromatic hydroxycarboxylic acids including p-hydroxybenzoic acid, m-hydroxybenzoic acid, p-(4-hydroxyphenyl)benzoic acid, 2-hydroxy-6-naphthoic acid, 2-hydroxy-7-naphthoic acid, and 1-hydroxy-5-naphthoic acid, and ester-forming derivatives of these acids including p-acetoxybenzoic acid, phenyl p-hydroxybenzoate, and so on.

Examples of the ingredients (b) and (d) are aromatic dicarboxylic acids including terephthalic acid, isophthalic acid, 4,4'-dicarboxydiphenyl, 2,6-dicarboxynaphthalene, 2,7-dicarboxynaphthalene, 1,5-dicarboxynaphthalene, and 1,2-bis(4-carboxyphenoxy)ethane and ester-forming derivatives of these acids including dimethyl terephthalate, diphenyl terephthalate, terephthaloyl chloride, and so on.

Examples of the ingredients (c) and (e) are aromatic dihydroxy compounds including hydroquinone, chlorohydroquinone, methylhydroquinone, phenylhydroquinone, resorcinol, 4,4'-dihydroxydiphenyl, 4,4'-dihydroxybenzophenone, 4,4'-dihydroxydiphenylmethane, 4,4'-dihydroxydiphenyl ether, 4,4'-dihydroxydiphenyl sulfone, 4,4'-dihydroxydiphenyl sulfide, 2,2-bis(4-hydroxyphenyl)propane, 2,6-dihydroxynaphthalene, 2,7-dihydroxynaphthalene, and 1,5-dihydroxynaphthalene, and ester-forming derivatives of these compounds including 1,4-diacetoxybenzene, and so on.

Crystalline polyesters are superior to amorphous polyesters in a number of properties such as chemical resistance, heat resistance, hydrolysis resistance, creep resistance, and hence find a wide variety of applications.

The crystalline polyester in the present invention, when its powder is analyzed by wide angle X-ray scattering, gives distinct peaks different from haloes due to amorphous portions of the polyester or when subjected to differential thermal analysis or differential scanning colorimetry, indicates a peak due to melting or to transition from one crystal form to another or to transition to liquid crystal. Suitable compositions of aforesaid starting monomers defined in this invention provide crystalline aromatic polyesters. However, compositions departing from the range seldom provide crystalline polyesters.

It is optional to copolymerize these ingredients with any of alicyclic or aliphatic dicarboxylic compounds and dihydroxy compounds as far as it does not impair physical properties such as crystallinity and heat resistance of the obtained polymer.

The liquid compound of the present invention can be exemplified by dibenzyltoluene (Marlotherm ®S, supplied by Hüls Company and Neo SK-Oil ® 1400, supplied by Soken Kagaku Co., Ltd., b.p. 390° C. under normal pressure), terphenyl (b.p. 350°–400° C.), hydrogenated terphenyl (Therm S ®-900, supplied by Shin Nittetsu Kagaku Co., Ltd., b.p. 364° C.), mineral oils (b.p. 310°–400° C.), alkyldiphenyl (Therm S ®-800, b.p. 340° C.; Therm S ®-700, b.p. 315° C.; Therm S ®-600, b.p. 286° C., all supplied by Shin Nittetsu Kagaku Co., Ltd.), benzyltoluene (Neo SK-Oil ® 1300, supplied by Soken Kagaku Co., Ltd., b.p. 280° C.), diisopropyldiphenyl (KSK-Oil ® 280, supplied by Soken Kagaku Co., Ltd., b.p. 303° C.), alkylnaphthalene (b.p. 300°–320° C.), silicone oils, and fluorocarbon oils.

An important point of the present invention is to incorporate the above liquid compound into the reaction system. Hence, the liquid compound needs to be added before or after initiation of the reaction. This addition can be performed (i) simultaneously with the charge of either the starting monomer or with a low molecular weight aromatic polyester prepared specially in advance from the starting monomer by condensation, (ii) after charge of either the starting monomer or the low molecular weight polyester, (iii) through a feed orifice or the like at a suitable time after initiation of the reaction, or (iv) in combined ways of (i), (ii), and (iii) above.

When the liquid compound is used in such an amount that the ratio of equation I is less than 0.7; the result of this polymerization is not much different from that of the solution polymerization method or slurry polymerization method of the prior art, some amount of the liquid compound remains in the obtained polymer, and thus the effect of the present invention cannot be expected. On the contrary, when said ratio exceeds 0.98; no difference appears between the result of this polymerization and that of the prior art bulk polymerization method, the viscosity of the reaction mixture rises as the polymerization proceeds, this being a difficulty in the bulk polymerization method, and therefore problems arise such that much power is necessary for the agitation, the quality of polymer varies because of the nonuniform agitation, and the polymer adheres in much amounts to walls of the polymerization vessel.

The polycondensation may be carried out in batchwise operation, continuous operation, or combined operations of them, under atmospheric or reduced pressure at a temperature of 250° to 390° C., preferably 280° to 370° C. At temperatures below 250° C., the polycondensation hardly takes place and at temperatures above 390° C., a side reaction such as decomposition may occur. The reaction temperature may be varied in multistages or in some cases may be raised to a prescribed level and lowered immediately thereafter. The reaction period is from 0.5 to 10 hours at the above temperatures.

For the purpose of preventing the heat resistance and other properties of the resulting polymer from deterioration, it is desirable to minimize the amount of the liquid compound remaining in the polymer. A method for this is, for instance, to pass an inert gas through the reaction product mixture under heating or to heat the product mixture in vacuo, whereby the remaining liquid compound can be removed from the product mixture. These heat treatments can also be made in another reaction vessel under atmospheric or reduced pressure. Moreover, the remaining liquid compound can also be removed by washing the product mixture with a low boiling solvent which does not deteriorate the quality of the resulting polymer.

It is not objectionable to allow the reaction mixture to contain a low boiling solvent which will be completely eliminated from the mixture during reaction. It is also possible to add previously a solvent and an auxiliary material to the reaction mixture for the purpose of a reaction, e.g. esterification, which converts a starting material monomer into its derivative polycondensible more easily. Moreover, the polycondensation in certain cases can also be carried out in the presence of a polymerization catalyst, a stabilizer, or other additives.

To illustrate the present invention in more detail, the following examples and comparative examples are given. However, these examples are not to be construed to limit the scope of the invention. Properties of polymers in the examples were determined in the following ways:

Average particle diameter: A prepared polymer was washed with acetone under reflux for 3 hours, and dried in vacuo at 80° C., thereby averting the effect of the liquid compound added to the polymerization mixture. The dried polymer powder was classified by using screens of 1680, 1100, 840, 500, 350, 250, 177, 105, and 74 μm meshs. Treating the data according to Rosin-Rammler equation, the average particle diameter was calculated.

Brightness L and color densities aL (red) and bL (yellow): Polymer particles having diameters of 74 to 246 μm were selected by screening and measured for the above color properties by using a colorimetric color-difference meter ND-K5 supplied by Nippon Denshoku Kogyo Co., Ltd.

Flow temperature: Using a flow tester CFT-500 supplied by Shimadzu Seisakusho Co., Ltd., a sample resin was extruded through a nozzle of 1 mm diameter × 10 mm length with a pressure of 100 kg/cm$^2$. The flow temperature is defined as the temperature at which the resin flowed, in this case, with a viscosity of 48,000 poises.

Weight loss: 10.00 g of polymer particles of diameters up to 250 μm were weighed out accurately, and heated in an oven at 350° C. for 3 hours. The resulting loss in the weight of the particles were determined as the weight loss.

EXAMPLE 1 AND COMPARATIVE EXAMPLES 1, 2, AND 3

In a 5-l reactor equipped with a stirrer having an anchor-shaped blade with a small clearance kept between it and the reactor wall, there were charged p-acetoxybenzoic acid, terephthalic acid, and 4,4'-diacetoxydiphenyl in molar proportions of 300:100:102 and Neo SK-Oil ® 1400 (b.p. 390° C. at normal pressure, supplied by Soken Kagaku Co., Ltd.) as a liquid compound so that the ratio of equation I would become each of 0.40 (Comparative Example 1), 0.74, 0.87, 0.94, 0.975 (these four: Example 1), 0.99 (Comparative Example 2), and 1.00 (Comparative Example 3). In these examples, the starting materials and the liquid compound were charged so that the total weight of them would be constant.

The air in the reactor was replaced with nitrogen gas, the reaction mixture was stirred at 200° C. for 30 min, the temperature was then raised at a rate of 3.5° C./min up to 330° C., where the reaction was effected for 3 hr under normal pressure while evaporating acetic acid was removed, and the reaction product mixture was cooled. In any of these examples, the agitation load increased at temperatures of 280°–310° C. There was a difference between the loads when the ratio of equation I was up to 0.975 (Comparative Example 1 and Example 1) and above 0.99 (Comparative Examples 2 and 3). The loads in the former case were lower.

In the cases except for Comparative Examples 2 and 3, the amount of polymer adhering to the reactor wall was very small. All the polymers obtained were in powder form but the powders of Comparative Examples 2 and 3 were contaminated with polymer blocks. Polymer particles based on the present invention were finer and more uniform in size. All the polymers obtained were pulverized to sizes of up to 1 mm, and heat-treated at 260° C. for 2 hr under reduced pressure. Table 1 shows the average particle diameter of each polymer before said pulverization, the yield of each pulverized and heat-treated polymer based on the theoretical yield, the brightness L, red color density aL, and yellow color density bL, the flow temperature, and the weight loss.

As is evident from the above-mentioned polymerization state and results shown in Table 1, the polyester prepared according to the process of the present invention has a smaller average particle diameter, more uniform particle sizes, higher brightness, less coloration, higher flow temperature, which may indicate a higher molecular weight, and superior heat stability at high temperatures.

TABLE 1

| Example No. | Ratio of equation I | Polymer yield (%) | Average particle diameter (μm) | Brightness L | Red aL | Yellow bL | Flow temperature (°C.) | Weight loss (%) |
| --- | --- | --- | --- | --- | --- | --- | --- | --- |
| Comparative Example 1 | 0.40 | 87.4 | 610 | 79.6 | 1.2 | 21.7 | 327 | 2.6 |
| Example 1 | 0.74 | 90.2 | 410 | 82.8 | 0.2 | 18.8 | 329 | 2.2 |
| | 0.87 | 91.8 | 310 | 83.5 | 0.0 | 17.5 | 328 | 1.9 |
| | 0.94 | 93.3 | 290 | 85.9 | 0.0 | 16.9 | 325 | 2.1 |
| | 0.975 | 95.8 | 490 | 82.9 | 0.3 | 19.6 | 323 | 2.3 |
| Comparative Example 2 | 0.99 | 97.6 | 830 | 77.6 | 1.2 | 22.3 | 319 | 3.1 |
| Comparative Example 3 | 1.00 | 97.2 | 960 | 76.3 | 1.7 | 22.6 | 317 | 3.7 |

EXAMPLE 2 AND COMPARATIVE EXAMPLES 4 AND 5

In the same 5-l reactor as used in Example 1 were charged 2,160 g of phenyl p-hydroxybenzoate and each of different amounts of NeO SK-Oil ® 1400 (b.p. 390° C. at normal pressure, supplied by Soken Kagaku Co., Ltd.) as a liquid compound. The amounts of NeO SK-Oil 1400 charged and the ratios of equation I were as follows:

| | Liquid compound | Value of equation I |
| --- | --- | --- |
| Comparative Example 4: | 0 g | 1.0 |
| Example 2: | 133 g | 0.9 |
| Comparative Example 5: | 1,800 g | 0.4 |

The air in the reactor was replaced with nitrogen gas, the reaction mixture was agitated at 200° C. for 30 min, the temperature was then raised at a rate of 3.5° C./min with stirring up to 330° C., where the reaction was effected for 3 hr under normal pressure while formed phenol was removed. During the reaction, the agitation load increased slightly though no difference in the load was observed among the three examples. In Comparative Example 4 much monomer sublimed, while in Example 2 no sublimed matter was observed. The polymer taken out after cooling was a powdery polyester in any of these Examples. The polymer was pulverized to sizes of up to 0.7 mm, and heat-treated at 250° C. for 2 hr under reduced pressure.

Table 2 shows the average particle diameter of each polymer obtained before said pulverization, the yield of heat-treated polymer based on the theoretical yield, the brightness L, red color density aL, and yellow color density bL, and the weight loss. It can be seen that the polyester of Example 2 based on the present invention has finer particle sizes and is superior in brightness, color, and heat stability.

TABLE 2

| Example No. | Ratio of equation I | Polymer yield (%) | Average particle diameter (μm) | Brightness L | Red aL | Yellow bL | Weight loss (%) |
| --- | --- | --- | --- | --- | --- | --- | --- |
| Comparative Example 5 | 0.40 | 93.8 | 490 | 82.3 | −0.1 | 19.7 | 2.3 |
| Example 2 | 0.90 | 97.2 | 290 | 86.8 | −0.3 | 15.8 | 1.2 |
| Comparative Example 4 | 1.00 | 96.8 | 620 | 80.4 | 0.1 | 20.3 | 2.1 |

EXAMPLE 3

In the same reactor as used in Example 1 were charged 276 g (2.0 mole) of p-hydroxybenzoic acid, 664 g (4.0 mole) of isophthalic acid, 750 g(4.03 mole) of 4,4'-dihydroxydiphenyl, 1,122 g (11.0 mole) of acetic anhydride, and 167 g (ratio of equation I:0.9) of Therm S ® 900 (b.p. 350° C. at normal pressure, supplied by Shin Nittestu Kagaku Co., Ltd.).

The reaction mixture under an atmosphere of nitrogen was refluxed at 140° C. for 3 hr to acetylate the monomers, the temperature was then raised at a rate of 3.5° C./min up to 330° C. while eliminating excess acetic anhydride and incidentally formed acetic acid. The polymerization was effected at that temperature for 3 hr. For several minutes in the course of reaction, the agitation load increased slightly. The polymer obtained after cooling was in the form of fine powder having an average particle diameter of 320 μm. The polymer heat-treated in the same manner as in Example 1 exhibited a brightness L of 85.8, a red aL of 0.1, and a yellow bL of 16.8. The weight loss was 2.3%.

EXAMPLE 4

In the same reactor as used in Example 1 were charged 1,328 g (8.0 mole) of terephthalic acid, 2,171 g (8.04 mole) of 2,5-diactoxydiphenyl, and 378 g (ratio of equation I: 0.87) of NeO SK-Oil® 1400 (b.p. 390° C., supplied by Soken Kagaku Co., Ltd.). These monomers were polymerized under the same conditions as applied in Example 1. During the cooling of the reaction product mixture, the agitation load increased but soon lowered. The polymer taken out was in the form of powder having an average particle diameter of 370 μm. The polymer heat-treated in the same manner as in Example 1 exhibited a brightness L of 80.3, a read aL of 0.2, a yellow bL of 18.3, and a flow temperature of 318° C., and a weight loss of 2.2%.

According to the process of the present invention, polymerization for producing an aromatic polyester can be carried out with little amounts of polymer adhering to reactor walls and with less agitation power, wherein the sublimation of monomers can be inhibited which is responsible for a change in the molar ratio of fed monomers. In addition, it is possible to reduce the amount of solvent remaining in the produced crystalline aromatic polyester. The thus produced polyester has fine and uniform particle sizes, exhibits less variations in properties and improved brightness and color, overcoming coloration problems, and is superior in stabilities such as heat resistance and solvent resistance.

What is claimed is:

1. In a process for producing an aromatic polyester by polycondensation of either
    (1) (a) aromatic hydroxycarboxylic acids containing at least 50 mole % of p-hydroxybenzoic acid, and/or ester-forming derivatives of these acids,
    (b) an aromatic dicarboxylic acid and/or an ester-forming derivative of aromatic dicarboxylic acid, and
    (c) an aromatic dihydroxy compound and/or an esterforming derivative of aromatic dihydroxy compound,
    wherein the (a):(b) molar ratio and the (a):(c) molar ratio are each from 1:0 to 1:4, or
    (2) (d) aromatic dicarboxylic acids containing at least 50 mole % of terephthalic acid, and/or esterforming derivatives of these acids and
    (e) aromatic dihydroxy compounds containing at least 50 mole % of at least one of hydroquinone, substituted hydroquinone, 4,4'-dihydroxydiphenyl, and substituted 4,4'-dihydroxydiphenyl, and/or ester-forming derivatives of these dihydroxy compounds,
    the improvement comprising carrying out the polycondensation by using a liquid compound which has a higher boiling point at normal pressure than the temperature of this reaction and is inert to the reaction, in an amount satisfying the equation (theoretical quantity of aromatic polyester formed)/{(theoretical quantity of aromatic polyester formed) + (quantity of liquid compound)} = 0.70 to 0.98, by weight.

2. The process of claim 1, wherein the liquid compound is dibenzyltoluene, terphenyl, hydrogenated terphenyl, mineral oil, alkyldiphenyl, benzyltoluene, diisopropyldiphenyl, alkylnaphthalene, silicone oil, or fluorocarbon oil.

3. The process of claim 1, wherein the ingredient (a) other than p-hydroxybenzoic acid is at least one member selected from the group consisting of m-hydroxybenzoic acid, p-(4-hydroxydiphenyl)benzoic acid, 2-hydroxy-6-naphthoic acid, 2-hydroxy-7-naphthoic acid, 1-hydroxy-5-naphthoic acid and ester-forming derivatives of these acids.

4. The process of claim 1, wherein the ingredients (b) and (d) are at least one member selected from the group consisting of terephthalic acid, isophthalic acid, 4,4'-dicarboxydiphenyl, 2,6-dicarboxynaphthalene, 2,7-dicarboxynaphthalene, 1,5-dicarboxynaphthalene, 1,2-bis(4-carboxyphenoxy)ethane, and ester-forming derivatives of these acids.

5. The process of claim 1, wherein the ingredients (c) and (e) are at least one member selected from the group consisting of hydroquinone, chlorohydroquinone, methylhydroquinone, phenylhydroquinone, resorcinol, 4,4'-dihydroxydiphenyl, 4,4'-dihydroxybenzophenone, 4,4'-dihydroxydiphenylmethane, 4,4'-dihydroxydiphenyl ester, 4,4'-dihydroxydiphenyl sulfone, 4,4'-dihydroxydiphenyl sulfide, 2,2-bis(4-hydroxyphenyl)propane, 2,6-dihydroxynaphthalene, 2,7-dihydroxynaphthalene, 1,5-dihydroxynaphthane, and ester-forming derivatives of these compounds.

6. The process of claim 1, wherein the ingredient (d) contains at least 50 mole % of terephthalic acid and the ingredient (e) contains at least 50 mole % of substituted or unsubstituted hydroquinone or 4,4'-dihydroxydiphenyl.

7. The process of claim 1, wherein the polycondensation is carried out at 250° C. for a period of 0.5 to 10 hours under normal or reduced pressure.

8. The process of claim 1, wherein a solvent is added to the reaction mixture.

9. The process of claim 1, wherein an inert gas is passed through the reaction product mixture under heating after completion of the reaction, thereby eliminating the liquid compound remaining in the polymer.

10. The process of claim 1, wherein the reaction product mixture after completion of the reaction is heated under reduced pressure to eliminate the liquid compound remaining in the polymer.

11. The process of claim 1, wherein the reaction product mixture is washed with a low boiling solvent which does not deteriorate the polymer quality, thereby eliminating the liquid compound remaining in the polymer.

* * * * *